US006765914B1

United States Patent
Jain et al.

(12)

(10) Patent No.: US 6,765,914 B1
(45) Date of Patent: Jul. 20, 2004

(54) GENERIC SWITCH ARCHITECTURE TO SUPPORT FLEXIBLE SUBNETS ACROSS LAYER-3 DEVICES

(75) Inventors: Vipin Kumar Jain, Santa Clara, CA (US); Cynthia M. Jung, Menlo Park, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/544,806

(22) Filed: Apr. 7, 2000

(51) Int. Cl.[7] .............................................. H04L 12/56
(52) U.S. Cl. ................................. 370/395.31; 370/390
(58) Field of Search ................................. 370/389, 390, 370/392, 393, 395.31

(56) References Cited

U.S. PATENT DOCUMENTS

| | | | |
|---|---|---|---|
| 5,920,699 A | * | 7/1999 | Bare .......................... 709/225 |
| 6,035,105 A | * | 3/2000 | McCloghrie et al. ....... 709/236 |
| 6,058,429 A | * | 5/2000 | Ames et al. ................. 709/242 |
| 6,195,356 B1 | * | 2/2001 | Anello et al. ............... 370/398 |

* cited by examiner

Primary Examiner—Wellington Chin
Assistant Examiner—William Schultz (57) ABSTRACT

The present invention is drawn to an system and a method for configuring subnets within a switch network that is typically comprised of switches and a router coupled together via a common shared bus. In one embodiment, a VLAN-defined (virtual local area network-defined) subnet is configured by mapping a subnet to a VLAN. All subnet members share a single VLAN ID irrespective of device boundaries of the switch network. In particular, in contrast to the span of a conventional subnet, the span of the VLAN-defined subnet is not required to be confined within a single switch's device boundary. As such, the present invention provides flexibility in configuring subnets. Moreover, an intra-VLAN packet forwarding mechanism is provided for said VLAN-defined subnet such that a packet can be transmitted between any two subnet members. This intra-VLAN packet forwarding mechanism avoids routing even when the VLAN-defined subnet spans more than one switch. Advantageously, packet transmission bottleneck found typically in the router is eliminated. Finally, in the presence of other of similarly configured VLAN-defined VLAN's, inter-VLAN packet forwarding can be provided flexibly with or without routing.

24 Claims, 8 Drawing Sheets

GENERIC SWITCH ARCHITECTURE TO SUPPORT FLEXIBLE SUBNETS ACROSS LAYER-3 DEVICES

FIELD OF THE INVENTION

The present invention is related to computer network. In particular, the present invention is related to configuring subnets flexibly within a computer network.

BACKGROUND ART

Network devices are sometimes stacked together and made into one single device constituting a network. Typically, such network is comprised of switches and a router that are coupled together by a shared bus. By being stacked and enclosed within a casing or chassis, these network devices (also known as stackables) and the shared bus are hidden from view. Only local switch ports of these switches are exposed to a user of the network. As such, hosts of the network is coupled to the network via the exposed local switch ports.

With the availability of a network as a stack of network devices, subnets can be configured within the network. However, possible subnet configurations are restricted by the device boundaries of the network. In particular, all members of a subnet must be connected to local switch ports belonging to a single switch. Or, equivalently, a subnet cannot cross the device boundary of a switch. As a result, subnets cannot be configured flexibly within the network. That is, one or more subnets can be configured on a single switch, yet no subnet can span more than one switch.

The inflexibility in configuring subnets across a switch's device boundary leads to several drawbacks. One such drawback is the network's inability to support a mobile network user. Once a host as a member of a subnet commits to a local switch port of a switch, relocating the host to a different switch disqualifies the host as a member of the subnet. Specifically, as a member of the subnet configured in the switch, this member is confined to the device boundary of the switch. Thus, the prior art subnet configuration is not well suited for supporting a mobile network user.

Another problem of implementing such network is inefficiency in forwarding packets between two local switch ports that reside respectively on different switches. Specifically, inter-switch packet forwarding is inherently inefficient for the given stack network architecture because the network architecture necessitates routing for all inter-switch packet forwarding. As such, within the given stack architecture of the network, communication bottleneck is created at the router because the router is frequently overwhelmed by such inter-switch packet forwarding. However, the stack network architecture still has merits. Thus, changing the stack network architecture to eliminate the bottleneck in order to have more efficient packet forwarding is not desirable.

Thus, a need exists for flexibly configuring subnets of the network irrespective of the device boundaries of the switches. Also, a need exists for a more efficient packet forwarding within the network while retaining the benefits of the physical stack network infrastructure without altering the network topology.

Fortunately, as will be explained below, the present invention solves all of the problems stated above with an ingenious network architecture and method for configuring subnets and forwarding packets.

SUMMARY OF THE INVENTION

The present invention is drawn to an architecture and method for configuring subnets within a switch network that is typically comprised of switches and a router coupled together via a common shared bus. The present invention enables subnets to be configured flexibly irrespective of device boundaries of the switches. The present invention also offers efficient packet forwarding within the network without altering the network topology, thereby retaining all of the benefits of the network topology without sacrificing performance.

In one embodiment of the present invention, a VLAN-defined (virtual local area network-defined) subnet is configured by mapping a subnet to a VLAN. All subnet members share a single VLAN ID irrespective of device boundaries of the switch network. In particular, in contrast to the span of a conventional subnet, the span of the VLAN-defined subnet is not required to be confined within a single switch's device boundary. As such, the present invention provides flexibility in configuring subnets. Moreover, an intra-VLAN packet forwarding mechanism is provided for the VLAN-defined subnet such that a packet can be transmitted between any two subnet members. This intra-VLAN packet forwarding mechanism avoids routing even when the VLAN-defined subnet spans more than one switch. Advantageously, packet transmission bottlenecks found typically in the router are eliminated. Finally, in the presence of other of similarly configured VLAN-defined subnets, inter-VLAN packet forwarding can be provided flexibly with or without routing.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS:

The accompanying drawings which are incorporated in and form a part of this specification, illustrate embodiments of the invention and together with the description, serve to explain the principles of the invention.

DETAILED DESCRIPTION OF THE INVENTION:

Reference will now be made in detail to the preferred embodiments of the invention, a stack network system and process for configuring subnets irrespective of network device boundaries, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Network Structure

Figure 1:
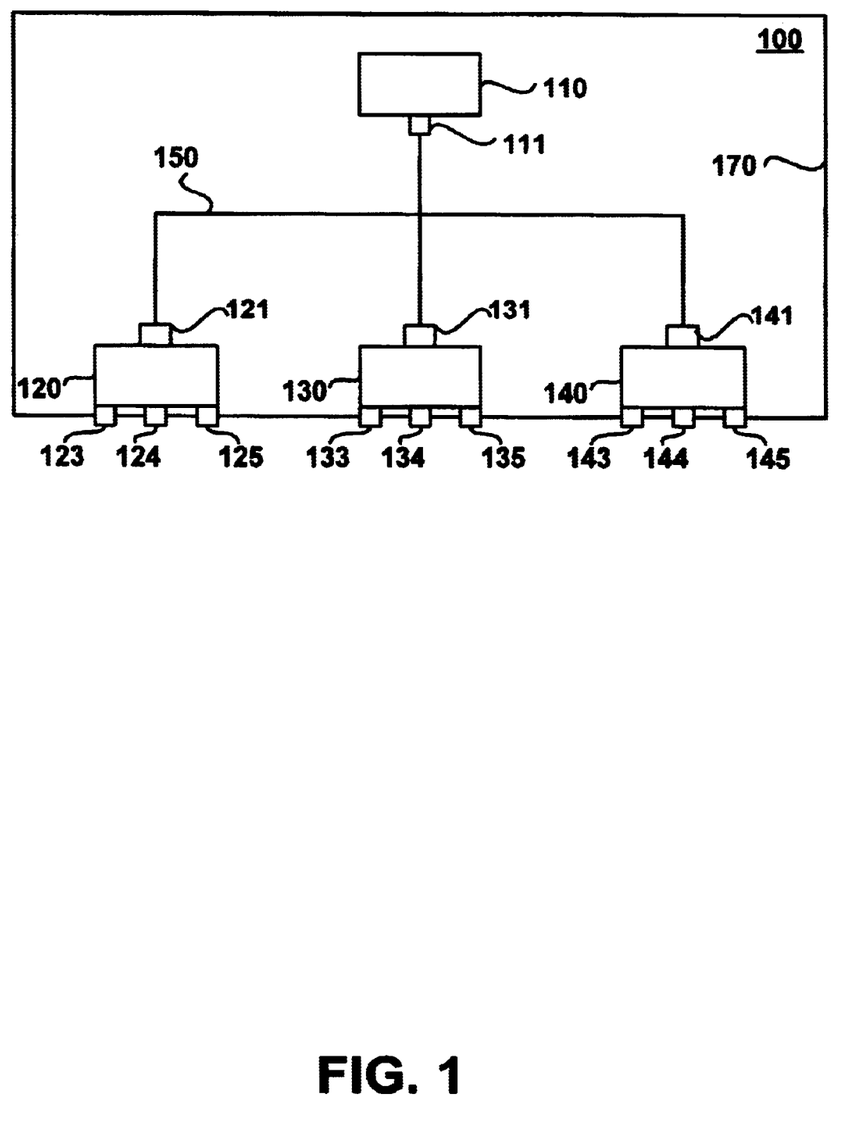
FIG. 1 depicts a stack network according to one embodiment of the present invention.

Referring now to FIG. 1, an organizational view of various network devices is depicted according one embodiment of the present invention. These network devices constitute a network architecture 100 (not including network hosts) as shown. In turn, network architecture 100 includes a router 110, three switches (120, 130 and 140), and a bus 150 coupling router 110 to switches 120, 130, and 140.

Referring still to FIG. 1, on a more detailed level, router 110 is coupled to bus 150 via a bus connecting port 111. Also, each of switches 120, 130, and 140 has its local switch ports and a bus connecting port. Specifically, three local switch ports 123–125 reside on switch 120; three local switch ports 133–135 reside on switch 130; and local switch ports 143–145 reside on switch 140. Furthermore, a bus connecting port 121 resides on switch 120; another bus connecting port 131 resides on switch 130; yet another bus connecting port 141 resides on switch 140.

Typically, network architecture 100 is realized/packaged as a chassis based product. That is, hosts are coupled to the chassis through local switch ports (123–125, 133–135, and 143–145) exposed by the chassis to users. In other embodiments, network architecture 100 is packaged within a casing wherein network devices such as router 110 and switches 120, 130 and 140 are stackables within the casing. Hosts are coupled to network architecture 100 through local switches ports (123–125, 133–135, and 143–145) that are exposed by the casing to users.

Figure 2:
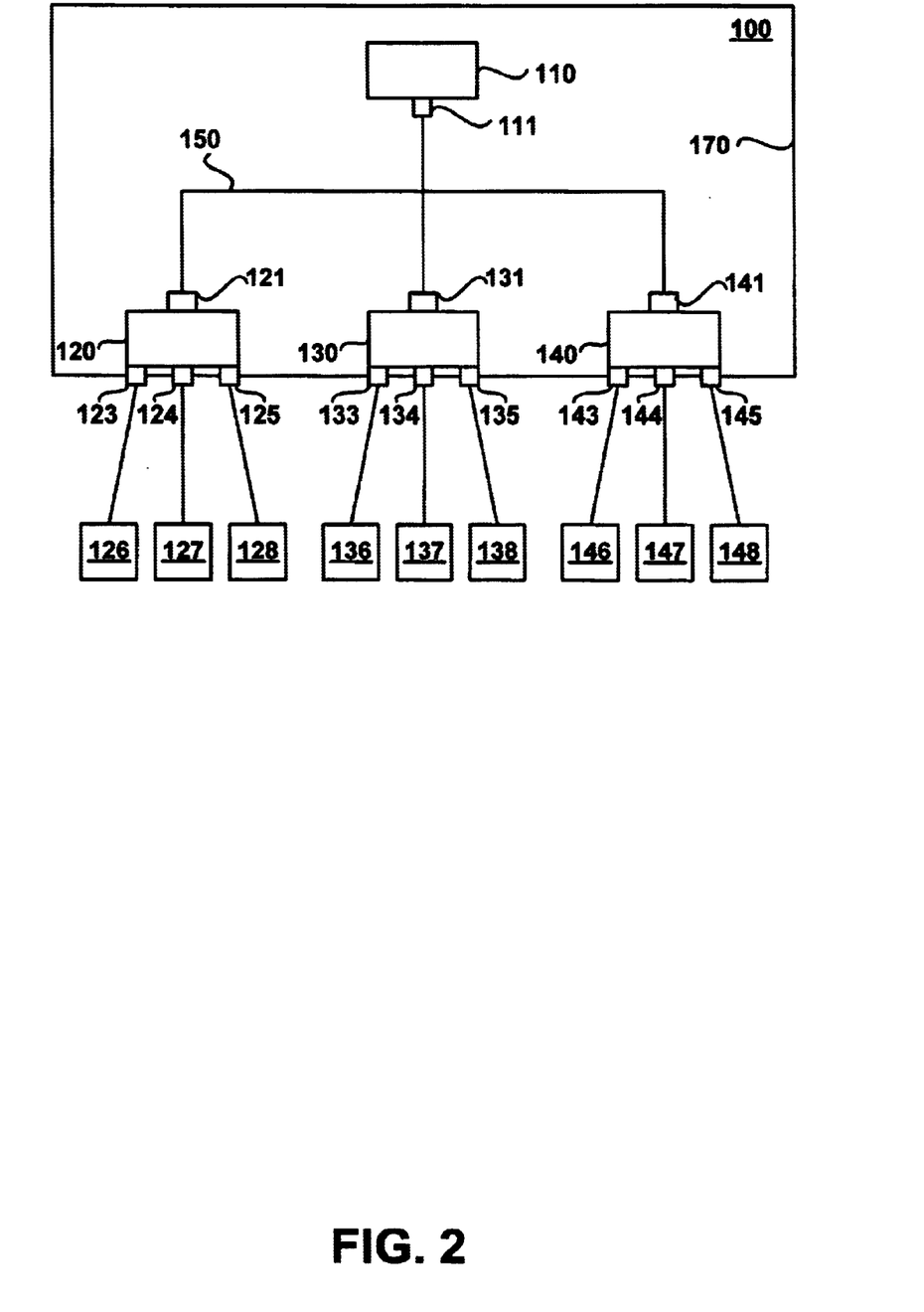
FIG. 2 depicts hosts that are coupled to the stack network as shown in FIG. 1.

Referring now to FIG. 2, hosts of network architecture 100 are shown coupling to network architecture 100 via local switch ports (123–125, 133–135, and 143–145). Specifically, hosts 126–128 are coupled to network architecture 100, respectively, through local switch ports 123–125. Also, hosts 136–138 are coupled to network architecture 100, respectively, through local switch ports 133–135. Finally, hosts 146–148 are coupled to network architecture 100, respectively, through local switch ports 143–145.

Subnet Configuration

In the prior art, within a network such as network 100, a subnet is configured to lie within a switch's device boundary. Specifically, any two members of a subnet can only be two hosts coupled to the same switch. Or equivalently, when two hosts are coupled to two different switches, these two hosts cannot be configured to lie within the same subnet. Fortunately, in contrast to the prior art, the present invention enables a subnet to be configured flexibly irrespectively of device boundaries.

Figure 3:
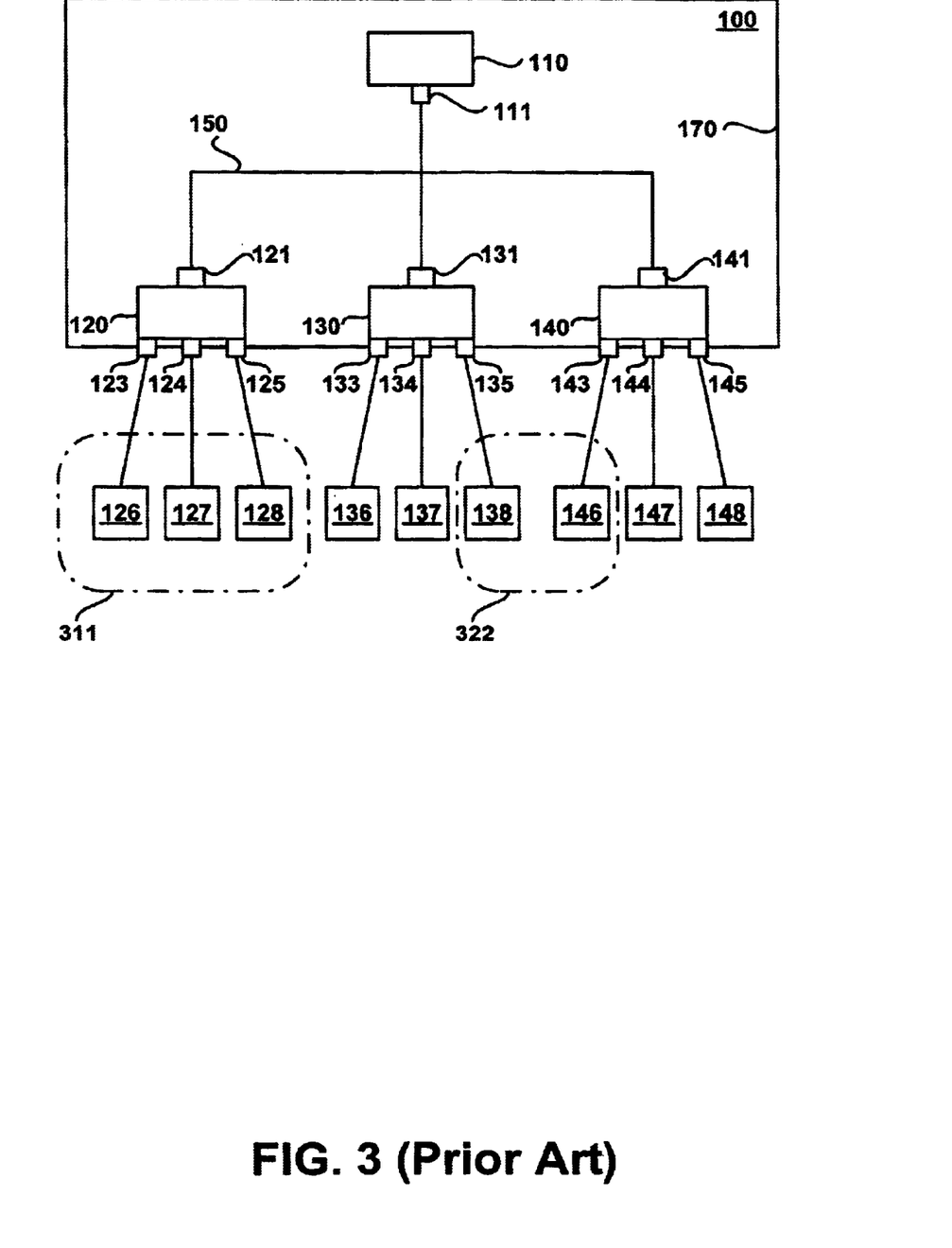
FIG. 3 depicts a permissible subnet configuration and a forbidden subnet configuration in accordance with the limitation of the prior art stack network architecture.

Referring now to FIG. 3, a prior art example of a possible subnet configuration 311 is shown. Furthermore in FIG. 3, an example of a subnet configuration 322 forbidden in the prior art is shown.

On the one hand, because hosts 126–128 are coupled to the same switch (i.e., switch 120), hosts 126–128 can be configured to belong to subnet 311 in accordance to the prior art approach. On the other hand, according to the prior art approach, because host 138 and host 146 are coupled to two different switches (switch 131 and switch 141 respectively), these two hosts (138 and 146) cannot be configured to belong to the same subnet. Rather, host 138 and host 146 must be assigned to two different subnets. In other words, a subnet configured according to the prior art approach cannot cross the device boundary of a switch.

Figure 4:
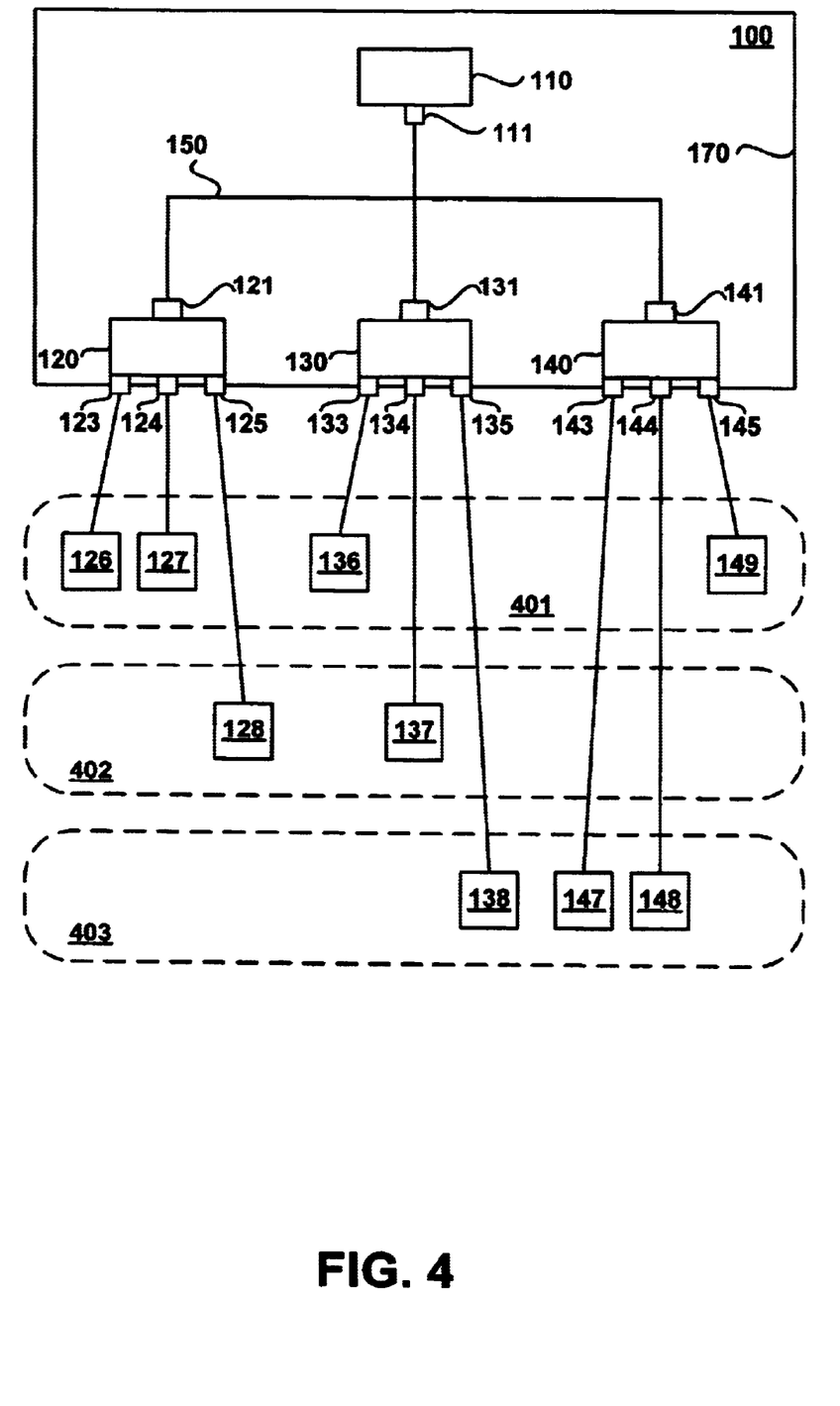
FIG. 4 depicts three subnet as permitted by one embodiment of the present invention.

Referring now to FIG. 4, several possible subnet configurations are shown according to one embodiment of the present invention. Three subnets 401–403 are configured. In particular, the members of subnet 401 include hosts 126 and 127 (coupled to switch 120); host 136 (coupled to switch 130); and host 149 (coupled to switch 140). As such, subnet 401 spans more than one switch, with subnet member hosts coupled to different switches (i.e., switches 120, 130, and 140). Thus, advantageously, subnet 401 configured according to the present embodiment need not be confined within a single switch's device boundary.

Similarly, subnet 402 spans more than one switch (i.e., switches 120 and 130). Also similarly, subnet 403 spans more than one switch (switches 130 and 140). In particular, members of subnet 402 include host 128 (coupled to switch 120) and host 137 (coupled to switch 130). Moreover, members of subnet 403 include host 138 (coupled to switch 130); and hosts 147 and 148 (coupled to switch 140). Again, advantageously, as demonstrated by subnets 402–403, a subnet configured according to the present embodiment need not be confined within a single switch's device boundary.

Figure 5:
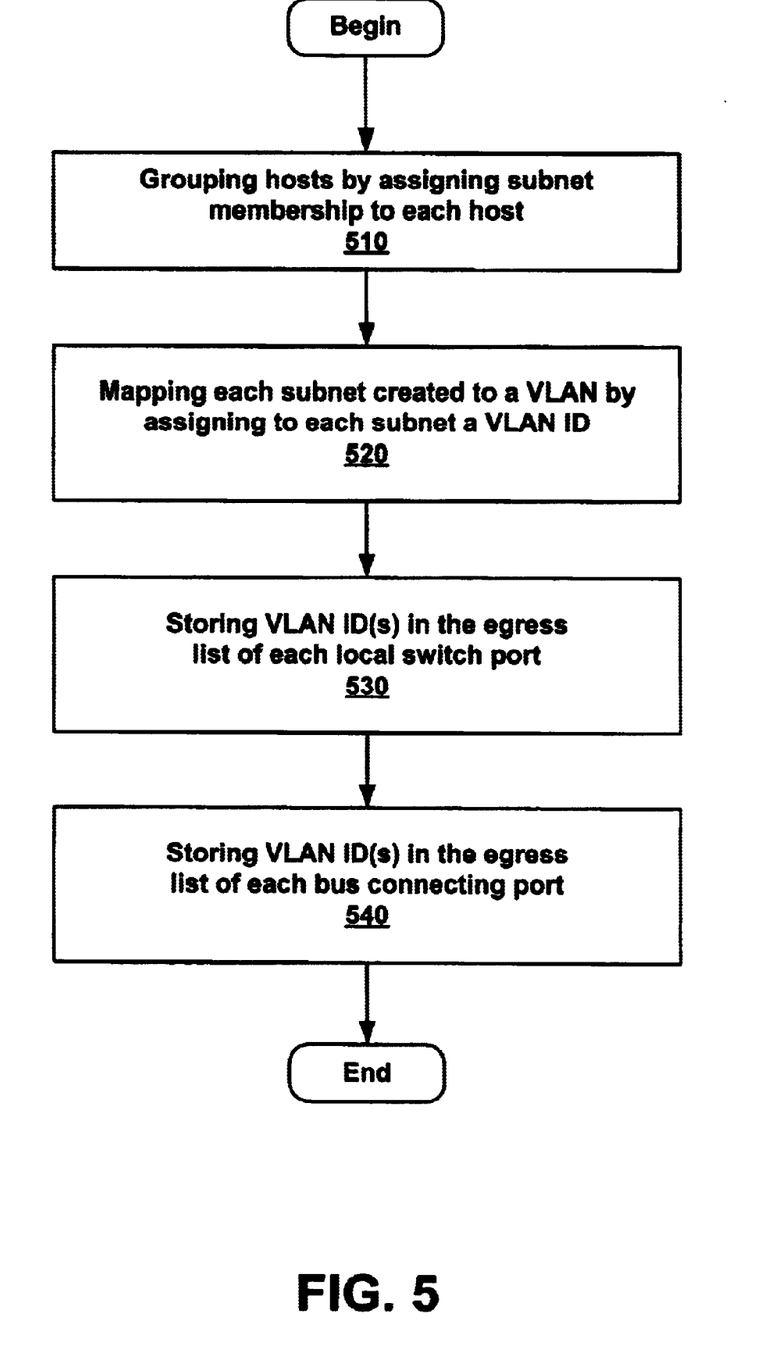
FIG. 5 is flow chart outlining the steps of intra-subnet packet forwarding in accordance with one embodiment of the present invention.

Referring now to FIG. 5, a flow chart 500 is shown in order to outline steps of configuring subnets within a stack network having stackable switches coupled to a router via a bus.

Referring still to FIG. 5, flow chart 500 begins with step 510. In step 510, hosts of the stack network are assigned to one or more subnets. Each host is coupled to the network via a local switch port a switch.

In step 520, each created subnet is mapped to a VLAN, thus beginning the formation of a VLAN-defined subnet that is designated by a VLAN ID. In particular, this mapping is implemented by assigning the same VLAN ID to each host belonging to the VLAN-defined subnet.

Steps 530 and 540 complete the formation and configuration of the VLAN-defined subnet. In step 530, each VLAN-defined subnet has a corresponding VLAN ID that is stored in each egress list of a local switch port coupled to a member host of the VLAN-defined subnet.

In step 540, each VLAN-defined subnet's VLAN ID is also stored in each bus connecting switch port of each switch coupled to a member host.

Figure 6:
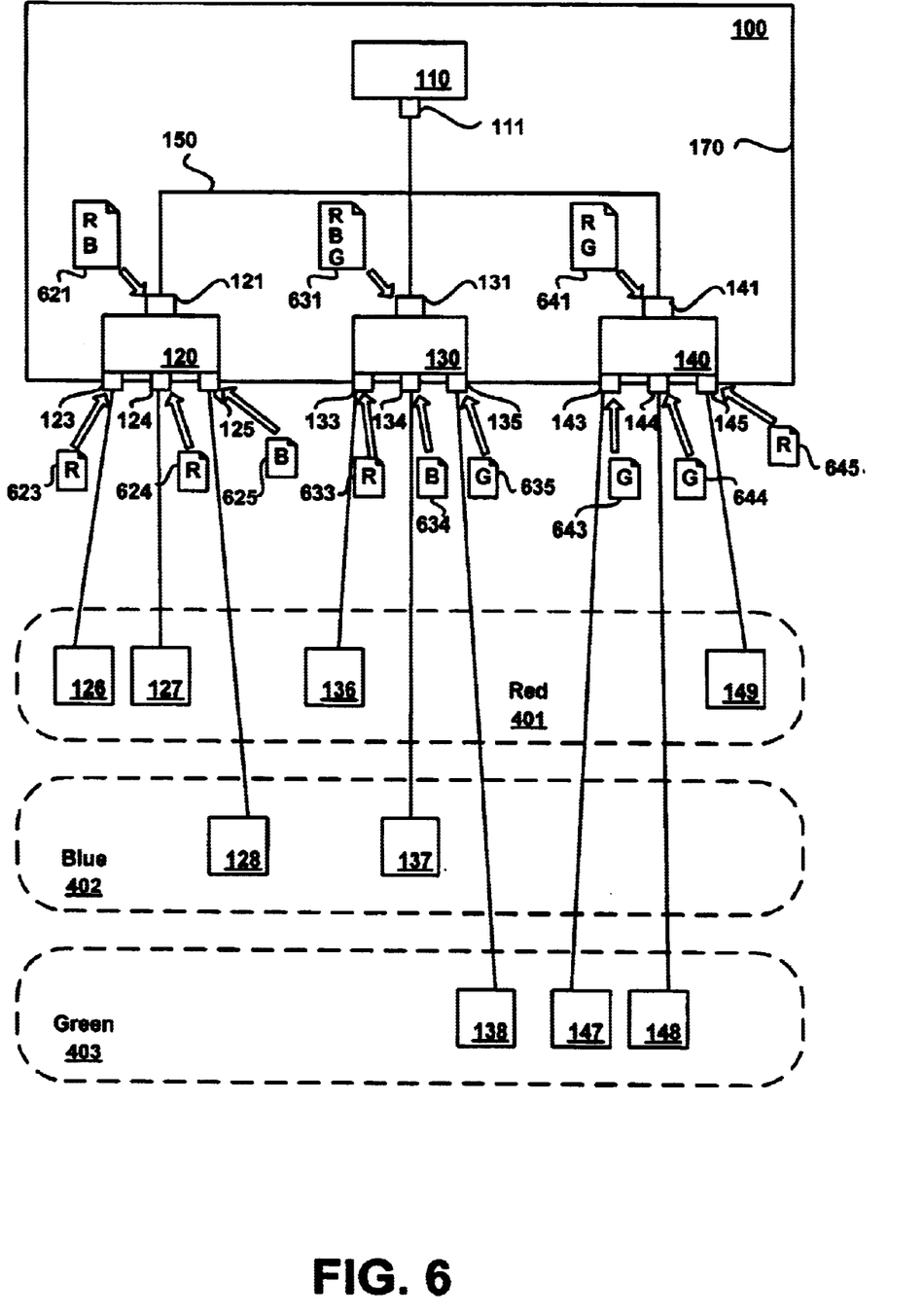
FIG. 6 depicts the three subnets shown in FIG. 4 as three VLAN-defined subnet in accordance with one embodiment of the present invention.

Referring now to FIG. 6, an example of three VLAN-defined subnets implemented according to the steps of flow chart 500 is shown. Hosts are assigned to three subnets 401–403 as shown before in FIG. 4. Furthermore, in this example, subnets 401, 402, and 403 are respectively mapped to a 'Red' VLAN, a 'Blue' VLAN, and a 'Green' VLAN for illustrative purposes. In particular, hosts 126, 127, 136 and 149 share the VLAN ID of 'Red.' Host 128 and host 137 share the VLAN ID of 'Blue.' Hosts 138, 147 and 148 share the VLAN ID of 'Green.'

Referring still to FIG. 6, egress lists (623–625, 633–635, and 643–645) shown, respectively, for local switch ports (123–125, 133–135, and 143–145) are implemented to configure VLAN-defined subnets 401–403. VLAN ID's are depicted as being stored in these egress lists. In particular, each of egress lists 623, 624, 633 and 645 stores 'Red' VLAN ID. Each of egress lists 625 and 634 stores a 'Blue' VLAN ID. Each of egress lists 635, 643 and 644 stores a 'Green' VLAN ID.

Referring still to FIG. 6, egress lists (621, 631 and 641), respectively, of bus connecting ports (121, 131 and 141) are shown. These egress lists (621, 631 and 641) also support the configuration and establishment of a VLAN-defined subnet. Switch 120 having bus connecting port 121 is coupled to hosts belonging to Red VLAN-defined subnet 401 and Blue VLAN-defined subnet 402. Thus, egress list 621 for bus connecting port 121 stores 'Red' and 'Blue' VLAN ID's. Switch 130 having bus connecting port 131 is coupled to hosts belonging to Red VLAN-defined subnet 401, Blue VLAN-defined subnet 402, and Green VLAN-defined subnet 403. Thus, egress list 631 of bus connecting port 131 stores 'Red', 'Blue', and 'Green' VLAN ID's. Switch 140 having bus connecting port 141 is coupled to hosts belonging to Red VLAN-defined subnet 401 and Green VLAN-defined subnet 403. Thus, egress list 641 for bus connecting port 141 stores 'Red' and 'Green' VLAN ID's.

Figure 7:
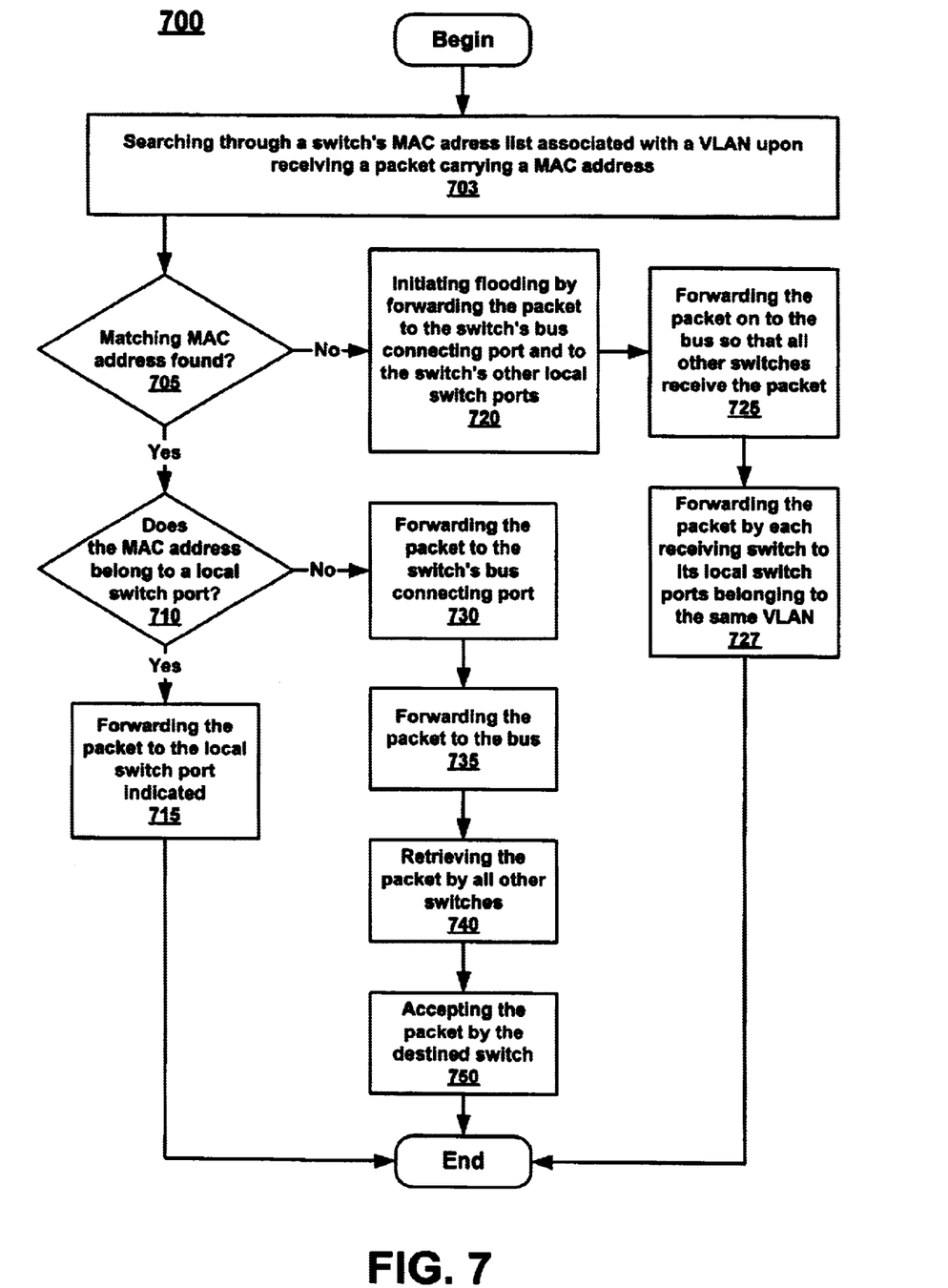
FIG. 7 is a flow chart outlining the steps for intra-subnet packet forwarding in accordance with one embodiment of the present invention.

Referring now to FIG. 7, a flow chart 700 is shown outlining the steps of forwarding a packet through a stack network having stackable switches coupled to a router via a bus. In particular, these steps are performed for intra-subnet packet forwarding in inter-switch setting. That is, the packet is forwarded between two hosts that are members of the same VLAN-defined subnet; yet, the two hosts reside respectively on two different switches in accordance with the present invention. As will be seen, routing is absent in these steps. Thus, the present invention advantageously eliminates routing to avoids bandwidth bottlenecks typically occurring at the router in conventional approaches.

In step 703, upon the arrival of a packet at a switch's local switch port wherein the packet has a VLAN ID, the switch searches within its list of MAC addresses associated with identified VLAN. Specifically, the switch searches within the list for a MAC address that matches a destination MAC address carried by the VLAN ID tagged packet.

Decision step 705 then follows step 703. In decision step 705, if a matching MAC address is found from the list, then decision step 710 is performed. Otherwise, if no matching address is found, step 720 is performed.

In decision step 710, if the MAC address belongs to the switch's local switch port, then the packet is forwarded in an intra-switch setting and an intra-VLAN setting. Specifically, step 715 is then performed to forward the packet to that local switch port without involving the bus nor the other switches. If, on the other hand, the MAC address does not belong to the switch's local switch, then the packet is forwarded in an inter-switch and an intra-VLAN setting, whereby another sequence of steps starting from step 730 is performed.

In step 730, the packet is forwarded to the bus connecting port of the switch. In so doing, the packet is poised to enter the bus.

In step 735, the packet is forwarded onto the bus from the bus connecting port of the switch.

In step 740, the packet is received by all of the other switches. Consequently, each switch determines if the packet is destined for a local switch port residing on that switch. If the packet is intended for one of the switch's local switch ports, then step 750 is performed.

In step 750, the packet is accepted by the switch. In turn, the switch forwards the packet to a local switch port intended for the packet.

Referring back to decision step 705, if no matching MAC address is found, then steps 720, 725, and 727 are performed to flood the packet on every local switch port carrying the VLAN ID of the VLAN-defined subnet.

In step 720, the flooding process is initiated by forwarding the packet to the local switch port(s) carrying the VLAN ID. The packet is also forwarded to the bus connecting port because the bus connecting port also! carries in its egress list the VLAN ID of the packet.

In step 725, the flooding process is continued. In particular, in step 725, the packet is forwarded onto the bus and received by all of the other switches.

In step 727, the flooding process is completed. Each switch forwards the packet received to all local switch ports carrying the particular VLAN ID. In so doing, the packet is forwarded to all local switch ports within the VLAN-defined subnet. Thus, the packet will be forwarded to its destination local switch port even at the expense of bus bandwidth.

Enhancing Inter-subnet Forwarding

Thus far, flow chart 700 has outlined the steps for performing intra-subnet (or, equivalently in the present invention, intra-VLAN) packet forwarding for both intra-switch setting and inter-switch setting. Some of the advantages have been routing-free packet forwarding, whether the packet forwarding is intra-switch or inter-switch. However, as far as inter-subnet (inter-VLAN) packet forwarding is concerned, the router is still utilized, thereby decreasing the network speed when forwarding packets among subnets. As such, in view of improving inter-subnet forwarding speed, an enhancement of inter-subnet (inter-VLAN) forwarding is introduced in one embodiment of the present invention.

Figure 8:
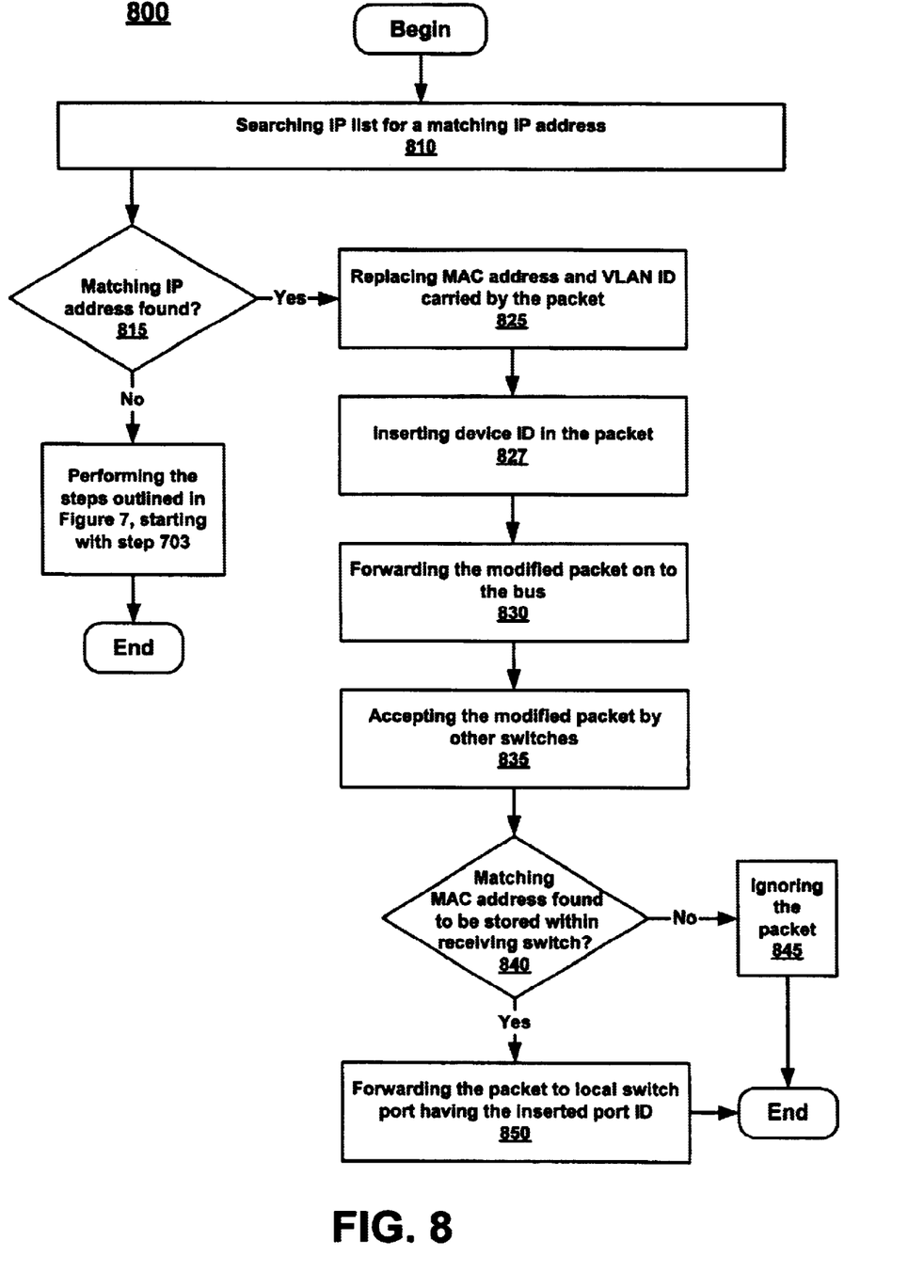
FIG. 8 is a flow chart outlining the steps for enhancing inter-subnet packet forwarding in addition to the steps for intra-subnet packet forwarding in accordance with one embodiment of the present invention.

In particular, referring now to FIG. 8, a flow chart 800 is shown outlining the steps for enhancing inter-subnet packet forwarding while still supporting the intra-subnet packet forwarding enhancement already described with respect to flow chart 700.

Referring still to FIG. 8, in step 810 a search is performed to find a matching IP within a list of IP addresses stored by the switch for the same VLAN-defined subnet.

In decision step 815, if the IP address does not have a matching IP address from the IP address list, then the steps outlined in flow chart 700 are implemented (starting with step 703). Otherwise, if the IP address has a matching IP address from the IP address list, then the steps outlined in flow chart 700 are not performed. Rather, step 825 is performed instead.

In step 825, the switch replaces the MAC address and the VLAN ID carried by the packet. In particular, the MAC address is replaced by a MAC address appropriate for forwarding on the destination local switch port, while the VLAN ID is replaced by a VLAN ID appropriate for forwarding on the destination local switch port.

Furthermore, in step 827, the switch inserts into the packet a device ID and a port ID of the destination local switch port. The device ID indicates which switch contains the destination local switch port for the packet. The port ID indicates the destination local switch port.

In step 830, the modified packet is forwarded onto the bus.

In step 835, the modified packet is received from the bus by the other switches. In particular, each switch performs the layer-two search of MAC addresses stored in the switch's list of MAC addresses.

In decision step 840, if a receiving switch does not find the matching MAC address, then step 845 is performed. Otherwise, if a receiving switch finds the matching MAC address, then step 850 is performed.

In step 845, the receiving switch ignores the packet and forwards the packet no further.

In step 850, the receiving switch forwards the packet to a local switch port having the port ID inserted into the packet.

In summary, advantageously, the present invention enables subnets to be configured flexibly irrespective of device boundaries of the switches. Also advantageously, the present invention offers efficient packet forwarding within the network without altering the network topology, thereby retaining all of the benefits of the network topology without sacrificing network performance.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. The scope of the invention is intended to be defined by the Claims appended hereto and their equivalents.

What is claimed is:

1. A method for configuring a subnet within a switch network having a plurality of switches and a router coupled together by a shared bus, said method comprising the steps of:
  a) mapping said subnet to a VLAN (virtual local area network) such that all nodes of said subnet share a VLAN ID (identification) irrespective of device boundaries of said switch network, wherein said subnet is not required to be confined within a single switch's device boundary;
  b) provided said subnet spans more than one switch, preserving intra-VLAN packet forwarding behavior without routing from said router, wherein a packet is transmittable between any two nodes of said subnet without routing;
  c) provided another VLAN-mapped subnet exists, providing inter-VLAN packet forwarding with routing.

2. The method of claim 1, wherein said step a) is further comprised of the steps of:
  a1) for each local switch port belonging to said VLAN, storing said VLAN ID in said local switch port's egress list; and
  a2) for each non-local switch port residing in a switch that has at least one local switch port belonging to said VLAN, storing said VLAN ID in said non-local switch port's egress list.

3. The method of claim 1, wherein said step b) is further comprised of:
  b1) upon a packet arriving at a first switch's local switch port that belongs to said VLAN, said first switch searching within its list of MAC (medium access control) addresses associated with said VLAN in order to find a MAC address that matches a destination MAC address carried by said packet;
  b2) provided no matching MAC address exist within said list, flooding said packet onto all local switch ports of said VLAN such that intra-VLAN packet forwarding behavior is preserved within said subnet, said flooding implemented without involving packet routing; and
  b3) provided said matching MAC address exists and is equal to a MAC address of a local switch port, said first switch forwarding said packet to said local switch port, said forwarding implemented without involving packet routing.

4. The method of claim 3, wherein said step b1) is further comprised of:
  said first switch searching within its list of IP (internet protocol) addresses associated with said switch network in order to find an IP address that matches a destination IP address carried by said packet, said destination IP address belonging to a destination local switch port targeted by said packet.

5. The method claim 4, wherein provided said matching IP address exists, said first switch bypasses performing said steps c) in order to provide inter-VLAN packet forwarding without routing, said first switch skipping over said step b2) and said step b3) to perform the steps comprising:
  t1) replacing said destination MAC address carried by said packet by a replacement MAC address that designates said destination local switch port targeted by said packet;
  t2) replacing said VLAN ID carried by said packet by a replacement VLAN ID that identifies VLAN membership of said destination local switch port targeted by said packet;
  t3) adding to said packet a device ID that indicates a second switch having said destination local switch port targeted by said packet, said device ID enabling said second switch to copy said packet from said shared bus after said first switch forwards said packet onto said shared bus; and
  t4) adding to said packet a port ID that indicates said destination local switch port for said packet, said port ID enabling said second switch to forward said packet to said destination local switch port without said second switch performing a lookup of IP address on said packet.

6. The method of claim 5, wherein said replacement MAC address, said replacement VLAN ID, said device ID and said port ID are downloaded and updated on said first switch's forwarding table by said router.

7. The method of claim 6, wherein said first switch further performs the steps comprising:
  r1) adding a source MAC address to said packet; and
  r2) adding a source VLAN ID to said packet, wherein said source MAC address and said source VLAN ID determine downloading and updating priority of entries within said first switch's forwarding table.

8. The method of claim 3, wherein said step b2) is further comprised of:
  u1) said first switch forwarding said packet to said shared bus to be retrieved by all other switches coupled with said shared bus;
  u2) all other switches forwarding said packet onto all local switch ports belong to said VLAN.

9. The method of claim 3, wherein said first switch forwards said packet to said second switch port such that no packet routing is required, provided in said step b3) said matching MAC address designates a second local switch port residing on said first switch.

10. The method of claim 3, wherein said first switch forwards said packet to said shared bus to be retrieved by said second switch to further forward said packet to said third local switch port such that no packet routing is required, provided in said step b3) said matching MAC address designates a third local switch port residing on a second switch.

11. The method of claim 10, wherein said packet on said shared bus is ignored by all switches other than said second switch.

12. The method of claim 3, wherein said first switch forwards said packet to said router provided in said step b3) said matching MAC address is said router's MAC address, wherein said router further forwards said packet to said packet's destination local switch port that belongs to another VLAN.

13. An architecture for configuring a subnet within a switch network having a plurality of switches and a router coupled together by a shared bus, said architecture comprising:
   a VLAN-defined subnet comprised of a subnet mapped to a VLAN (virtual local area network) such that all members of said VLAN-defined subnet share a VLAN ID (identification) irrespective of device boundaries of said switch network, wherein the span of said VLAN-defined subnet is not required to be confined within a single switch's device boundary;
   for said VLAN-defined subnet, an intra-VLAN packet forwarding mechanism that does not need routing from said router even when said VLAN-defined subnet spans more than one switch, wherein a packet is transmittable between any two members of said VLAN-defined subnet without routing; and
   for said VLAN-defined subnet, an inter-VLAN packet forwarding mechanism for packet forwarding from said VLAN-defined subnet to another VLAN-defined subnet.

14. The architecture of claim 13, wherein VLAN-defined subnet is mapped to said VLAN by performing the steps comprising of:
   a1) for each local switch port belonging to said VLAN, storing said VLAN ID in said local switch port's egress list; and
   a2) for each non-local switch port residing in a switch having at least one local switch port belonging to said VLAN, storing said VLAN ID in said non-local switch port's egress list.

15. The architecture of claim 13, wherein said intra-subnet packet forwarding mechanism is comprised of the steps of:
   b1) upon a packet arriving at a first switch's local switch port that belongs to said VLAN, said first switch searching within its list of MAC (medium access control) addresses associated with said VLAN in order to find a MAC address that matches a destination MAC address carried by said packet;
   b2) provided no matching MAC address exist within said list, flooding said packet onto all local switch ports of said VLAN such that intra-VLAN packet forwarding behavior is preserved within said subnet, said flooding implemented without involving packet routing; and
   b3) provided said matching MAC address exists and is equal to a MAC address of a local switch port, said first switch forwarding said packet to said local switch port, said forwarding implemented without involving packet routing.

16. The architecture of claim 15, wherein said first switch searches within its list of IP (internet protocol) addresses associated with said switch network in order to find an IP address that matches a destination IP address carried by said packet, said destination IP address belonging to a destination local switch port targeted by said packet.

17. The architecture claim 16, wherein said step b2) and said step b3) are skipped over provided said matching IP address exists, and wherein said inter-VLAN packet forwarding mechanism avoids routing by having said first switch perform the steps comprising:
   t1) replacing said destination MAC address carried by said packet by a replacement MAC address that designates said destination local switch port targeted by said packet;
   t2) replacing said VLAN ID carried by said packet by a replacement VLAN ID that identifies VLAN membership of said destination local switch port targeted by said packet;
   t3) adding to said packet a device ID that indicates a second switch having said destination local switch port targeted by said packet, said device ID enabling said second switch to copy said packet from said shared bus after said first switch forwards said packet onto said shared bus; and
   t4) adding to said packet a port ID that indicates said destination local switch port for said packet, said port ID enabling said second switch to forward said packet to said destination local switch port without said second switch performing a lookup of IP address on said packet.

18. The architecture of claim 17, wherein said replacement MAC address, said replacement VLAN ID, said device ID and said port ID are downloaded and updated on said first switch's forwarding table by said router.

19. The architecture of claim 18, wherein said first switch further performs the steps comprising:
   r1) adding a source MAC address to said packet; and
   r2) adding a source VLAN ID to said packet, wherein said source MAC address and said source VLAN ID determine downloading and updating priority of entries within said first switch's forwarding table.

20. The architecture of claim 15, wherein said step b2) is further comprised of:
   u1) said first switch forwarding said packet to said shared bus to be retrieved by all other switches coupled with said shared bus;
   u2) all other switches forwarding said packet onto all local switch ports belong to said VLAN.

21. The architecture of claim 15, wherein said first switch forwarding said packet to said second switch port such that no packet routing is required provided in said step b3) said matching MAC address designates a second local switch port residing on said first switch.

22. The architecture of claim 15, wherein said first switch forwards said packet to said shared bus to be retrieved by said second switch to further forward said packet to said third local switch port such that no packet routing is required, provided in said step b3) said matching MAC address designates a third local switch port residing on a second switch.

23. The architecture of claim 22, wherein said packet on said shared bus is ignored by all switches other than said second switch.

24. The architecture of claim 15, wherein said first switch forwards said packet to said router provided in said step b3) said matching MAC address is said router's MAC address, wherein said router further forwards said packet to said packet's destination local switch port that belongs to another VLAN.

* * * * *